(12) United States Patent
Fabian et al.

(10) Patent No.: US 12,437,178 B2
(45) Date of Patent: Oct. 7, 2025

(54) SECURITY FEATURE FOR A DATA MEDIUM, AND DATA MEDIUM

(71) Applicant: Giesecke+Devrient ePayments GmbH, Munich (DE)

(72) Inventors: Cristina Fabian, Garching (DE); Thomas Tarantino, Laufen (DE); Klaus Kohl, Miesbach (DE); Josef Riedl, Attenkirchen (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/682,786

(22) PCT Filed: Aug. 9, 2022

(86) PCT No.: PCT/EP2022/025367
§ 371 (c)(1),
(2) Date: Feb. 9, 2024

(87) PCT Pub. No.: WO2023/016668
PCT Pub. Date: Feb. 16, 2023

(65) Prior Publication Data
US 2024/0370685 A1   Nov. 7, 2024

(30) Foreign Application Priority Data
Aug. 11, 2021 (DE) .................. 102021004132.1

(51) Int. Cl.
*G06K 19/07* (2006.01)
*G06K 19/073* (2006.01)

(52) U.S. Cl.
CPC .............. *G06K 19/07309* (2013.01)

(58) Field of Classification Search
CPC .................. G06K 19/07309; B42D 25/337
(Continued)

(56) References Cited

U.S. PATENT DOCUMENTS

| 2004/0076310 A1 | 4/2004 | Hersch et al. |
| 2007/0177131 A1* | 8/2007 | Hansen .......... G07D 7/207 356/71 |

(Continued)

FOREIGN PATENT DOCUMENTS

| DE | 60310977 T2 | 10/2007 |
| DE | 102016007784 A1 | 12/2017 |

(Continued)

OTHER PUBLICATIONS

Kipphan, Helmut, "Raster and Intaglio", Handbook of Print Media: Technologien und Produktionsverfahren, Springer Verlag, as early as Jan. 1, 2000, pp. 25-28, 49-53, 92-102, 402, and 522-540.

(Continued)

*Primary Examiner* — Toan C Ly
(74) *Attorney, Agent, or Firm* — Workman Nydegger

(57) ABSTRACT

A security feature for a data carrier, having a substrate, an encoded representation of the security feature arranged in or on the substrate, wherein a plurality of individual representations are contained in the encoded representation and wherein the plurality of individual representations are arranged in a division over a dimension of the security feature, and a decoder with a grid, wherein a grid pitch of the grid of the division corresponds to an integer multiple of the division or a halving of the division.

15 Claims, 2 Drawing Sheets

(58) Field of Classification Search
USPC .......................................................... 235/492
See application file for complete search history.

(56) References Cited

U.S. PATENT DOCUMENTS

2016/0307035 A1* 10/2016 Schilling ................ B42D 25/36
2019/0009609 A1    1/2019 Dietemann

FOREIGN PATENT DOCUMENTS

| DE | 102017004682 A1 | 11/2018 | |
|----|----|----|----|
| EP | 1322480 A1 | 7/2003 | |
| FR | 3046110 A1 | 6/2017 | |
| WO | 2005078669 A1 | 8/2005 | |
| WO | WO-2008015317 A2 * | 2/2008 | ....... G06K 19/07749 |

OTHER PUBLICATIONS

Van Renesse, Rudolf, "Transitory images and screen-decoded images", Optical Document Security, Artech House, as early as Jan. 1, 2005, pp. 111 and 137-167.
German Search Report from Corresponding German Patent Application No. DE102021004132.1, Apr. 29, 2022.
International Search Report from Corresponding PCT Application No. PCT/EP2022/025367, Nov. 16, 2022.

* cited by examiner

SECURITY FEATURE FOR A DATA MEDIUM, AND DATA MEDIUM

FIELD OF THE DISCLOSURE

The invention relates to a security feature for a data carrier and to a data carrier having a security feature.

BACKGROUND

Data carriers such as valuable documents, for example passport and identity documents, identity cards, and such as chip cards, for example credit cards, debit cards and the like, are finding increased use in public areas, but also within organizations.

The practice of providing such valuable documents or banknotes with arrays of lenses in the form of lenticular lenses has been known for quite some time. Such structures equip the valuable documents with optically variable effects, for example tilting images, which should offer protection against reproduction at the same time.

A security feature referred to as Magic ID is disclosed in EP 1 322 480 A1. This security feature is offset printed, and lenticular lenses are arranged over the security feature at a later stage. This production process is complicated. Moreover, the image quality of the security feature depends on the printing process.

SUMMARY

It is therefore the object of the present invention to simplify the production of security features and, at the same time, increase the number of possible applications of the security feature.

A security feature according to the invention for a data carrier comprises a substrate, an encoded representation of the security feature arranged in or on the substrate, wherein a plurality of individual representations are contained in the encoded representation and wherein the plurality of individual representations are arranged in a division over a dimension of the security feature, and a decoder with a grid, wherein a grid pitch of the grid of the division corresponds to an integer multiple of the division or a halving of the division.

In this context, a halving of the division is understood to mean divisions of a half, a quarter, an eighth, and so on. The division is provided over or along at least one dimension. In the case of a line grid, the division is provided along one dimension, for example the width or the length, of the security feature. In the case of a dot grid, the division can be provided along two dimensions, for example the width and the length, of the security feature. The encoded representation with the plurality of individual representations is calculated prior to production, with the result that, at a later stage, it can be decoded by and observed using an optical decoder fitting thereto.

A basic idea of the present invention consists of replacing lenses with a grid which operates as a light-diffracting or light-refracting structure. Such an optical grid is matched to the encoded representation and enables optical effects such as a tilting image, i.e. a change between two images, or a moving representation, i.e. an animation over a plurality of images.

Thus, the security feature proposed here is advantageous in that the generation of a tilt effect, a moving image or a decoding can be realized without a complicated lens. This simplifies the production and opens up new applications.

Provision can be made for the grid to be designed in the form of a line grid or dot grid. Both variants allow even complicated optical effects to be realized by way of a simple structure.

Further, provision can be made for, in the viewing direction, the decoder to be arranged above or below the encoded representation on the substrate. In the case of a transparent substrate, this increases flexibility during production and construction of the security feature.

Provision can be made for the decoder to comprise demetallized structures. For example, this allows the decoder to be formed in a metal layer or metallic film by virtue of the demetallized structures being removed from the layer or film, for example by way of an etching or milling procedure. It is also possible to omit the demetallized structures in a coating with metal.

Further, provision can be made for the decoder to be provided externally to the encoded representation and, in the viewing direction, be arrangeable above the encoded representation. The spatial separation of decoder and encoded representation opens up new applications and may simplify manufacture since the decoder need not be directly fastened to the encoded representation. The decoder need only be arranged above or else below the encoded representation during a decoding process, for example when checking a passport.

Provision can be made for the decoder to be a smartphone app, in which a grid fitting to a respective encoded representation is provided. For example, the grid can be depicted in a camera view of the encoded representation. As a result, the encoded representation and the grid of the decoder are arranged above one another, with the result that the encoded representation is decoded. The smartphone app may contain security features and may be connected to, for example, a central server for data synchronization or data verification. In the case of the smartphone app, a plurality of decoders may be provided for different security features or documents.

Further, provision can be made for the encoded representation to be displayed on an electronic visual display or for the decoder to be an electronic visual display, wherein the grid corresponds to a line or dot pitch of the electronic visual display. If the encoded representation is displayed on an electronic visual display, the decoder with the grid, for example in the form of a transparent film, may be held against the electronic visual display or adhesively bonded thereto. Likewise, the electronic visual display can be a decoder, wherein the encoded representation is displayed on an electronic visual display and the grid of the decoder corresponds to a line or dot pitch of the electronic visual display. Then, the encoded information is decoded by superimposing the decoder and encoded representation on one another.

Provision can be made for the substrate to be transparent. The substrate may also be designed to be partially transparent or opaque with a transparent or partially transparent window. Then, the security feature or the representation can be observed from both sides, i.e. from a front side and a back side. The decoder can be attached to one side of the substrate and the encoded representation can be attached to the opposite side of the substrate. Likewise, the decoder and the encoded representation may be attached on one side of the substrate.

Further, provision can be made for the encoded representation to be a security guilloche. Then, the fine structures of a security guilloche are designed according to the calculated individual representations of the encoded representation.

Further, provision can be made for the encoded representation to be a moving representation when the security feature is tilted. For example, the moving representation can be a tilting image which tilts or alternates between two or more representations when the encoded representation is moved relative to the eye of the observer. For example, the moving representation might also be a movement over a plurality of images. These images can be depicted moving in an endless movement. The number of images corresponds to the number of the plurality of individual representations. The encoded representation or the plurality of individual representations are calculated such that the representation when tilting the security feature is a moving representation. This can be implemented during data preparation prior to production. For example, the moving representation can be a tilting image which tilts or alternates between two or more representations when the representation is moved relative to the eye of the observer. For example, the moving representation might also be a movement over a plurality of images. These images can be depicted moving in an endless movement.

Provision can be made for the encoded representation to be a moving representation when there is relative movement between the decoder and the encoded representation. As an alternative to tilting the entire security feature, a moving representation can also be generated by relative movement, for example a translational movement between the decoder and the encoded representation. For example, the encoded representation can be arranged on a visa page of a passport and the decoder can be present on a data page. Then, the encoded representation is decoded when these two pages of the passport are placed over one another.

A data carrier according to the invention, such as a valuable document or a chip card, comprises a carrier on or in which a security feature as described above is arranged. The data carrier may be arranged completely within an opening. The opening with the data carrier situated therein may for example be covered by means of one or more transparent films. The data carrier can be a valuable document such as a banknote, a passport document or an identity document. Ultimately, the security feature may be attached to any data carrier such as a valuable document or a chip card. Otherwise, the same advantages and modifications as described above apply.

Provision can be made for the decoder to be an antenna of the data carrier and be arranged below the encoded representation in a transparent region of the data carrier. This arrangement enables a thin structure of the data carrier since the antenna adopts both the transmission and/or reception function and the decoding function.

Further, provision can be made for the decoder to be arranged in a transparent region of a data page of a valuable document and for the encoded representation to be arranged on a paper page of the valuable document. For example, the valuable document could be a passport or identity document with a data page made of one or more plastic materials or layers and with one or more visa pages made of paper.

BRIEF DESCRIPTION OF THE DRAWINGS

The present invention is described by way of example below, with reference being made to the attached drawings, in which.

DETAILED DESCRIPTION OF VARIOUS EMBODIMENTS

Figure 1:
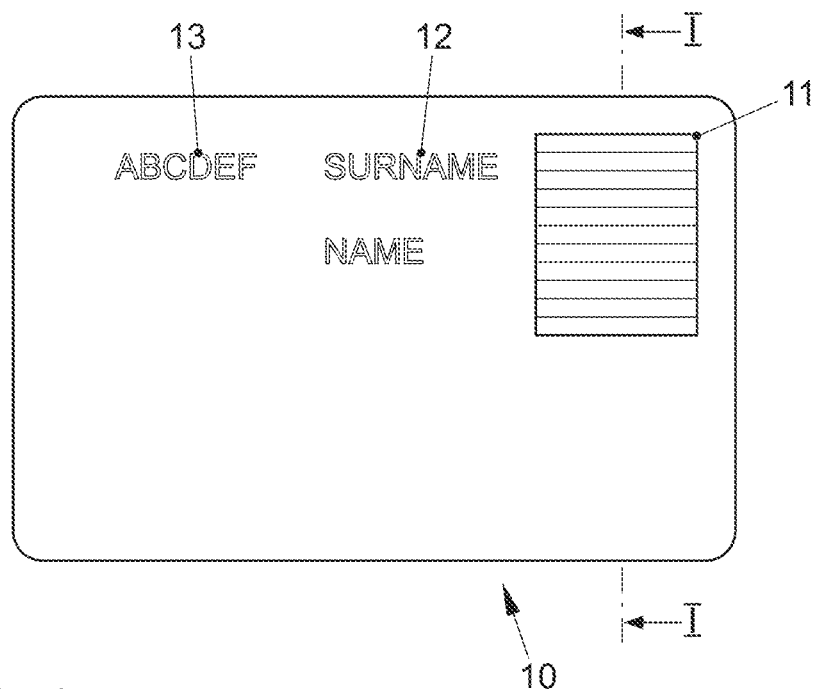
FIG. 1 shows a plan view of a data carrier with a security feature.

FIG. 1 shows a plan view of a data carrier 10 in a schematic illustration. In this case, the data carrier 10 is a valuable document and can be a banknote, a passport and identity document or the like. The data carrier 10 can likewise be a chip card. The data carrier 10 is an identity document in the example depicted in FIG. 1.

The data carrier 10 contains a security feature 11, for example in the form of a symbol. The security feature 11 is a moving image or a tilting image. The security feature 11 is at least partially arranged in an opening 10*a* in the data carrier 10.

The data carrier 10 contains further person-related data 12, for example the first and last name of the owner. Moreover, the identity card may contain further data 13, for instance date of birth, nationality, issuing authority, date of issue and the like.

Figure 2:
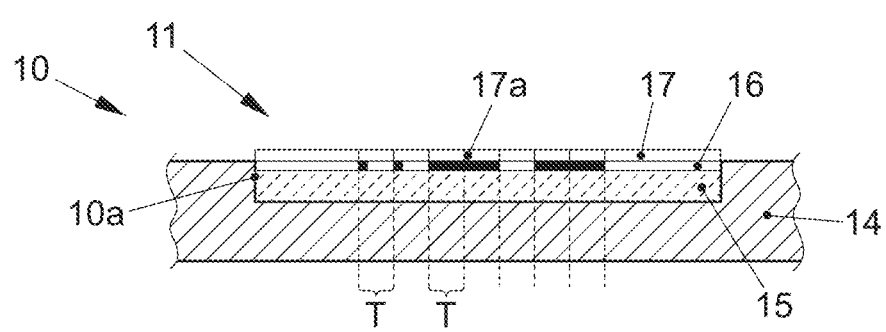
FIG. 2 shows a sectional illustration of the data carrier of FIG. 1 according to the line I-I.

The basic structure of the security feature 11 will now be explained in more detail with reference to FIG. 2, which shows a section through the data carrier 10 along the line I-I in FIG. 1.

The data carrier 10 contains a card body 14 and the security feature 11, the latter being at least partially arranged in an opening 10*a* in the data carrier 10 or card body 14. The card body 14 may be transparent or partially transparent in the visible spectral range. The card body 14 may also be opaque; in that case, a transparent or partially transparent window is provided in the region below the opening 10*a*. The security feature 11 may be placed on the card body 14 or may be embodied as one or more layers of the card body 14. The opening 10*a* in the data carrier 10 can be dispensed with in these cases.

The security feature 11 comprises a substrate 15, on or in which an encoded representation 16 of the security feature 11 is formed. The encoded representation 16 is applied to one side, in this case a top side or front side, of the substrate 15. The substrate 15 may be transparent or partially transparent in the visible spectral range.

A decoder 17 with a grid 17*a*, which at least partially covers the security feature 11 or the encoded representation 16, is arranged on a top side or front side of the encoded representation 16 or card body 14.

The encoded representation 16 contains a plurality of individual representations. These individual representations are visible as individual images or individually by way of changes in the viewing angle when observing the security feature 11 or by way of a relative movement between the encoded representation 16 and the decoder 17. For example, the individual representations might be defined and calculated representations of gears which then rotate with one another like in a short film or a continuous loop in the case of viewing angle changes or in the case of a relative movement.

To this end, the encoded representation 16 and the decoder 17 are optically matched to one another. Thus, the encoded representation 16 or the plurality of individual representations are arranged in a division T over a dimension of the security feature 11. Accordingly, structures such as lines of the optical grid 17a of the decoder 17, for example, have a grid pitch corresponding to an integer multiple of the division or a halving of the division T. This also comprises the case where the grid pitch corresponds exactly to the division T. Hence, the grid pitch can be derived from the division T of the encoded representation 16 by way of a factor, where the factor has a value of . . . , ⅛, ¼, ½, 1, 2, 4, . . . . Further smaller or larger values of the sequence are likewise possible as a factor for the grid pitch.

The encoded representation 16 has been calculated prior to the introduction on the substrate 15 such that the representation is a moving representation when tilting the security feature 11 or data carrier 10. For example, the encoded representation 16 might be or comprise a Magic ID security feature.

For example, the moving representation can be a tilting image which tilts or alternates between two or more representations when the encoded representation 16 is moved relative to the view of the observer. For example, the moving representation might also be a movement over a plurality of images. These images can be depicted moving in an endless movement.

The division T is included as a parameter in the calculation of the encoded representation 16. One image can be provided per division. The number of images in the encoded representation 16 is calculated within the scope of data preparation prior to the creation of this encoded representation 16.

The images introduced into the encoded representation 16 could contain purely graphical representations, for example rotating gears, text elements, pictorial representations or else person-related information. The encoded representation 16 may comprise any person-related data, for example a signature, a date of birth or the like. Moreover, the encoded representation 16 may comprise data relating to the data carrier 10, for example a validity period, a card number, specifications regarding the issuing authority or the like.

The data carrier 10 may comprise additional layers, for example one or more protective layers or functional layers provided with other security elements. In the process, the transparency of the data carrier 10 in the region of the security feature 11 can be maintained. This allows the security feature 11 to be observed both from the front side and from the back side of the data carrier 10.

As a result of the calculated interaction between the encoded representation 16, or the individual elements thereof, and the decoder 17 with the grid 17a, a viewer sees the viewing angle-dependent encoded representation 16 when looking at the data carrier 10 from the front side or else the back side. If the data carrier 10 with the encoded representation 16 is pivoted or tilted then a movement of the encoded representation 16 becomes visible, said movement being generated by the calculated interaction of the encoded representation 16 with the decoder 17 with the grid 17a.

Figure 3:
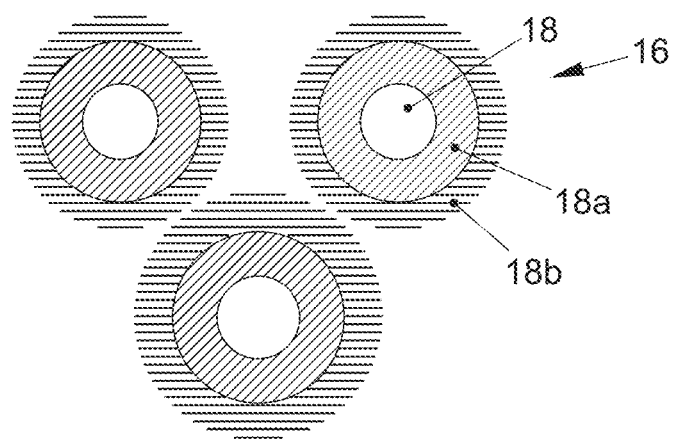
FIG. 3 shows a basic illustration of an encoded representation of the security feature.

FIG. 3 shows a basic illustration of an encoded representation 16 of the security feature 11. In this case, the encoded representation 16 contains three elements 18, which each represent a gear. In the encoded representation, the three elements 18 are not identifiable as a gear; this is only rendered possible by an interaction with an appropriate decoder.

It is possible to identify that the element 18 has a central ring-shaped region 18a. This region 18a is largely untouched by the encoding/decoding; therefore, this region 18a is also visible or identifiable in the encoded representation. In this example, this region 18a comprises the base of the gear which carries the teeth.

A further region 18b of the element 18 is represented here as an outer ring and it is not visible or not identifiable in the encoded representation. In this example, this region 18b comprises the teeth of the gear. These are only fully identifiable upon interaction with an appropriate decoder.

It is possible to identify that the region 18b, which in this case represents the teeth of the gear, consists of parallel lines. These lines are arranged in accordance with the division T. The plurality of individual representations are contained in these parallel lines. In the current example of the gears, each individual representation contains a different position of the teeth or gears.

Thus, the encoded representation 16 may also contain non-encoded regions, which then do not move in the moving representation.

The number of lines may correspond to the number of desired individual representations. Accordingly, the division T can be defined as the dimension, such as length or width of the encoded representation 16, divided by the number of desired individual representations.

Figure 4:
FIG. 4 shows a basic illustration of a decoder of a security feature.

FIG. 4 shows a basic illustration of a decoder 17 of a security feature 11.

The decoder 17 has a grid 17a, wherein a grid pitch of the grid corresponds to the division T, an integer multiple of the division T or a halving of the division T.

In the viewing direction, the decoder 17 may be arranged above or below the encoded representation 16 on the substrate 15. The decoder 17 may comprise demetallized structures or may consist thereof.

It is also possible that the decoder 17 is formed externally to the encoded representation 16 and, in the viewing direction, can be arranged above the encoded representation 16.

To this end, the decoder 17 can be embodied as an optical layer, for example as a film. Likewise, the decoder can be a cellular telephone or a smartphone app, in which a grid fitting to a respective encoded representation 16 is provided in a camera display of the encoded representation 16. Further, the decoder 17 can be an electronic visual display, wherein the grid corresponds to a line or dot pitch of the electronic visual display.

In summary, it should be observed that the decoder 17 comprises a grid 17a which is derived from the division of the encoded representation 16 and which is already arranged or may already be arranged on the encoded representation 16.

Figure 5:
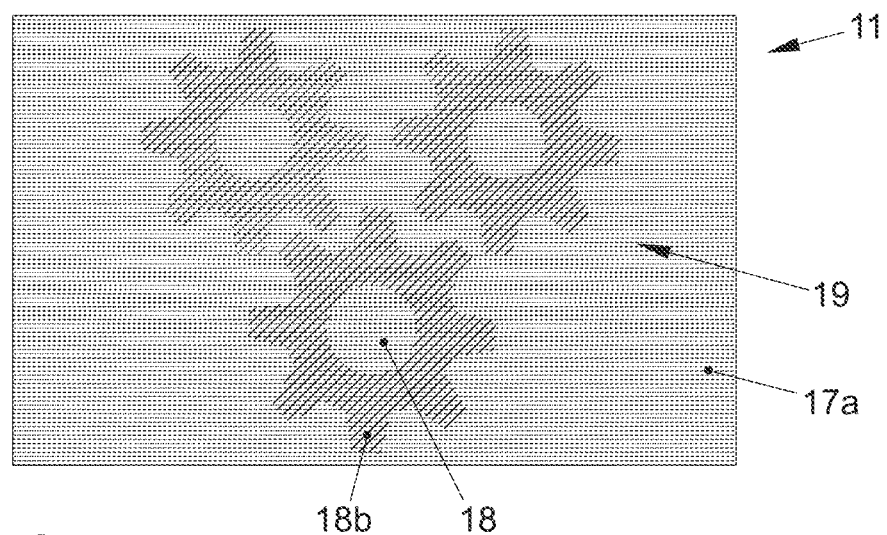
FIG. 5 shows a basic illustration of a decoded representation of a security feature.

FIG. 5 shows a basic illustration of a decoded representation 19 of a security feature 11. This decoded representation 19 arises when the decoder 17 with the grid 17a is arranged above or else below the encoded representation 16.

The further region 18b of the element 18 of the encoded representation 16 is now identifiable in full. In this example, the teeth of the gear are now identifiable in full during the interaction with the appropriate decoder 17.

FIG. 5 depicts an individual representation of the encoded representation 16. In the case of a security feature 11, a pivoting movement of the security feature 11 or a tilting of the head would lead to a moving representation, in which the gears rotate.

The invention claimed is:

1. A security feature for a data carrier, comprising:
a substrate,
an encoded representation of the security feature arranged in or on the substrate, and
a decoder with a grid,
wherein a plurality of individual representations are contained in the encoded representation, wherein each of the plurality of individual representations are arranged in a division over a dimension of the security feature, wherein a grid pitch of the grid of the decoder corresponds to an integer multiple of the division or a halving of the division, and wherein a number of the plurality of individual representations is equal to a number of divisions over the dimension of the security feature.

2. The security feature according to claim 1, wherein the grid is designed in the form of a line grid or dot grid.

3. The security feature according to claim 1, wherein, in the viewing direction, the decoder is arranged above or below the encoded representation on the substrate.

4. The security feature according to claim 3, wherein the decoder comprises demetallized structures.

5. The security feature according to claim 1, wherein the decoder is provided externally to the encoded representation and, in the viewing direction, is arrangeable above the encoded representation.

6. The security feature according to claim 5, wherein the decoder is a smartphone app, in which a grid fitting to a respective encoded representation is provided.

7. The security feature according to claim 5, wherein the encoded representation is displayed on an electronic visual display or in that the decoder is an electronic visual display, wherein the grid corresponds to a line or dot pitch of the electronic visual display.

8. The security feature according to claim 5, wherein the encoded representation is a moving representation when there is relative movement between the decoder and the encoded representation.

9. The security feature according to claim 1, wherein the substrate is transparent.

10. The security feature according to claim 1, wherein the encoded representation is a security guilloche.

11. The security feature according to claim 1, wherein the encoded representation is a moving representation when the security feature is tilted.

12. A data carrier such as a valuable document or a chip card, having a carrier on or in which a security feature according to claim 1 is arranged.

13. The data carrier according to claim 12, wherein the decoder is an antenna of the data carrier and is arranged below the encoded representation in a transparent region of the data carrier.

14. The data carrier according to claim 12, wherein the decoder is arranged in a transparent region of a data page of a valuable document and in that the encoded representation is arranged on a paper page of the valuable document.

15. A data carrier comprising:
a carrier on or in which a security feature is arranged, the security feature comprising:
a substrate,
an encoded representation of the security feature arranged in or on the substrate,
wherein a plurality of individual representations are contained in the encoded representation,
wherein each of the plurality of individual representations are arranged in a division over a dimension of the security feature, and
a decoder with a grid,
wherein a grid pitch of the grid of the decoder corresponds to an integer multiple of the division or a halving of the division,
wherein the decoder is an antenna of the data carrier and is arranged below the encoded representation in a transparent region of the data carrier.

* * * * *